United States Patent [19]

Lindsey

[11] 4,409,384
[45] Oct. 11, 1983

[54] VISCOSE PREPARATION USING LOW CONCENTRATION CAUSTIC

[75] Inventor: William B. Lindsey, Clinton, Iowa

[73] Assignee: E. I. Du Pont de Nemours and Company, Wilmington, Del.

[21] Appl. No.: 320,218

[22] Filed: Nov. 12, 1981

[51] Int. Cl.$^3$ .............................................. C08G 18/10
[52] U.S. Cl. ..................................... 536/60; 106/164; 536/57; 536/61
[58] Field of Search ........................... 536/60, 61, 57; 106/164

[56] References Cited

U.S. PATENT DOCUMENTS

| | | | |
|---|---|---|---|
| 1,279,329 | 9/1918 | Glover et al. | 536/60 |
| 1,860,432 | 5/1932 | Richter | 162/65 |
| 1,917,646 | 7/1933 | Herrmann | 536/61 |
| 2,614,102 | 10/1952 | Schlosser et al. | 260/233 |
| 2,643,999 | 6/1953 | Drisch | 536/61 |
| 2,735,846 | 2/1956 | Richter | 260/233 |
| 2,858,304 | 10/1958 | Bradshaw et al. | 260/233 |
| 2,985,647 | 5/1961 | Von Kohorn | 260/217 |
| 3,298,844 | 1/1967 | Swakon | 106/165 |
| 3,395,140 | 7/1968 | Williams | 536/61 |
| 3,728,330 | 4/1973 | Sihtola et al. | 260/217 |
| 4,269,973 | 5/1981 | Geyer, Jr. et al. | 536/101 |
| 4,287,334 | 9/1981 | Fauth et al. | 536/60 |

FOREIGN PATENT DOCUMENTS

| | | |
|---|---|---|
| 7900082-1 | 7/1979 | European Pat. Off. . |
| 2801820 | 7/1979 | Fed. Rep. of Germany . |
| 2941624 | 10/1979 | Fed. Rep. of Germany . |
| 502858 | 3/1939 | United Kingdom . |

OTHER PUBLICATIONS

Hirosi Sobue, "Regarding the Knowledge of Alkali Cellulose, I–II", Aug. 30, 1939.

Theodor N. Kleinert, "Reaction Mechanisms of Alkali Cellulose Air Aging".

"Studies on the Mechanism of the Aging of Alkalicellulose", Part Two of a Special Report, Jun. 1938, Hawkesbury, Ontario.

Primary Examiner—A. Lionel Clingman

[57] ABSTRACT

A process for the production of an acceptably filterable viscose from cellulose whereby cellulose is treated with an aqueous solution containing 13 to 16 weight percent NaOH, peroxide aged, xanthated and dissolved in dilute aqueous NaOH.

6 Claims, No Drawings

VISCOSE PREPARATION USING LOW CONCENTRATION CAUSTIC

BACKGROUND OF THE INVENTION

The field of the subject invention is the production of viscose from cellulose.

In the early processes for the production of viscose, cellulose is first steeped at about 20°-50° C. in 17 to 22 percent aqueous NaOH (unless otherwise specified, all percentages herein are by weight) resulting in alkali cellulose. NaOH concentrations of less than 17.0 percent have not been reported heretofore as being useful in this single steeping operation. In order to achieve a proper viscosity in the final viscose, the alkali cellulose is then depolymerized, normally accomplished by allowing the alkali cellulose to react with atmospheric oxygen or an oxidizing reagent such as hydrogen peroxide.

After depolymerization, the alkali cellulose is reacted with carbon disulfide ($CS_2$) to produce a cellulose xanthate. If the NaOH concentration in the alkali cellulose is higher than about 16 percent, an unacceptable amount of $CS_2$ is required to effectuate this xanthation step due to side reactions of the $CS_2$ with the excess caustic. Therefore, it is well known in the art that prior to xanthation, the alkali cellulose can be re-steeped in an aqueous solution of about 10-12 percent NaOH to reduce the NaOH concentration in the alkali cellulose. This double steeping process, of course, results in increased manufacturing costs.

Following the xanthation step, the cellulose xanthate is mixed with a dilute aqueous NaOH solution in order to dissolve the xanthate, filtered to remove undissolved particles and foreign matter and extruded into an acid bath to regenerate the cellulose in the form of spinnable filaments in the case of rayon and film in the case of cellophane. The filtering step following the dissolving of the cellulose xanthate is a test of the success of the viscose preparation process in that if the original alkali cellulose does not contain at least about 12 percent NaOH, the cellulose xanthate made therefrom will not dissolve sufficiently and hence will clog the subsequent filtering process.

Recognizing the advantages of a low NaOH concentration single steep process, U.S. Pat. No. 2,614,102 issued on the application of Schlosser et al discloses forcing at least 12% aqueous NaOH through sheets of paper pulp at high pressures thus maintaining contact between the cellulose molecules and a constant concentration of NaOH. This process, however, requires a cumbersome mixing apparatus.

SUMMARY OF THE INVENTION

It has now been discovered that cellulose can be single steeped in about 13 to 16 percent NaOH to produce an alkali cellulose containing about 12 to 15 percent NaOH, peroxide aged, xanthated and dissolved to produce an acceptably filterable viscose without the need for complex mixing means.

More particularly, the subject invention is a process for the production of an acceptably filterable viscose from cellulose comprising the steps of contacting the cellulose with an aqueous solution containing between 13 and 16 percent NaOH for a time and at a temperature sufficient to produce an alkali cellulose with a NaOH content of about 12 to 15 percent; concurrently aging the alkali cellulose by contact with sufficient $H_2O_2$ to reduce the DP of the cellulose to a desirable level pressing the resulting alkali cellulose; xanthating the alkali cellulose; and dissolving the cellulose xanthate in dilute aqueous NaOH so that the resulting viscose contains at least 4.0% NaOH.

DETAILED DESCRIPTION

The cellulose to be treated according to the process of the subject invention is commonly in the form of sheeted or shredded paper pulp. The cellulose content in the pulp is generally between 85 and 95 percent, depending upon the grade pulp used.

In the first step of the process of the subject invention, cellulose is treated with NaOH to swell the cellulose fibers so that in the concurrent depolymerization step, the peroxide responsible for the aging can contact substantially all of the cellulose fibers. Therefore, a sufficient concentration of NaOH need be used to effectuate this swelling.

However, as mentioned above, if too much NaOH is used, the xanthation of the cellulose requires an inordinate amount of $CS_2$ and the viscose end-product evidences poor filterability. The steeping step of the subject invention, therefore, is carried out in an aqueous mercerizing slurry containing 13 to 16 weight percent NaOH for a time and at a temperature sufficient to achieve an alkali cellulose with a NaOH concentration of about 12 to 15 percent by weight of the alkali cellulose. Generally, the steeping step can be carried out at between 10° and 60° C. for 5 to 30 minutes, preferably 20° to 50° C. for about 15 minutes. As seen below, these parameters will result in an acceptably filterable viscose, however, when operating in the lower range of slurry NaOH concentrations, i.e., 13 to 14 percent, the steeping is preferably carried out at relatively low temperatures, i.e., about 20° C.

Concurrently with the production of the alkali cellulose, it is necessary to depolymerize the cellulose molecules. Initially, the cellulose has an average DP of about 1000. For the production of cellophane, the cellulose DP need be reduced to about 250 to 400, whereas for the production of rayon, the ultimate DP may be as high as about 800 (determined using the formula $DP = (n)^{1.105} \times 118.4$ where n is the viscosity of the cellulose solution in accordance with TAPPI T230 os-76, 1.0% pulp in 0.5 M cupriethylenediamine). The process of the subject invention, utilizing low concentrations of caustic in the steeping step, does not allow a rapid enough rate of air aging of the alkali cellulose to effect the desired depolymerization within a practical time period. Therefore, the subject invention utilizes peroxide aging, in some cases in conjunction with air aging, to effectively depolymerize the cellulose molecules. This aging is accomplished by concurrently reacting the alkali cellulose in the mercerizing slurry with sufficient $H_2O_2$ to reduce the DP to the desired level. Generally speaking, this level is achieved by contact with the mercerizing slurry containing about 0.1 to 0.6% $H_2O_2$ by weight of pulp at 20° to 50° C. for at least 10 minutes. Further, it is necessary to include a catalyst in the reaction to assist in the depolymerization. The catalyst is selected from the group consisting of Iron (Fe), Manganese (Mn) and Cobalt (Co) compounds as, for example, $KMnO_4$ and $CoCl_3$ present in an amount equal to 10 to 40 ppm based on the weight of the steeping caustic. This alkali cellulose is then pressed to remove excess caustic until a cellulose content of about 30 to 35 weight percent is achieved.

Xanthation of the depolymerized alkali cellulose is well known in the art. The alkali cellulose is commonly contacted with a 25 to 40 weight percent aqueous $CS_2$ solution at 20° to 35° C. for about 30 minutes until all of the $CS_2$ is consumed. Due to the initial low NaOH concentration in the steeping solution and consequent low NaOH content in the alkali cellulose, less $CS_2$ is required than in those single steeping processes of the prior art. Further, unwanted sulfide by-products are reduced.

The resulting cellulose xanthate is then dissolved in dilute aqueous NaOH and the solution filtered. This dissolution and filtering is carried out at about 15° to 20° C.

The filterability of this viscose is a measure of the success of the viscose preparation process. If the solution clogs the filter process, an insufficient amount of viscose is recovered. The filterability of this viscose is measured utilizing "F" values. These "F" values, well known in the art, are determined according to the following procedure: Viscose is pumped at a rate of 30 cc/min. through a 1.0 in$^2$ C-125-D Filpaco filter medium sold by Filpaco Industries, Inc., Chicago. The pressure required to maintain the 30 cc/min. rate is measured every minute for 7 minutes. Using single cycle, semi-log graph paper, the pressure is plotted on the log scale and the time on the rectangular scale. The slope of the straight line drawn through the points is measured and the "F" value found by dividing 600 by the slope of the line. For purposes of the subject invention, an acceptably filterable viscose is one with an "F" value of greater than about 300.

The process of the subject invention will be more clearly appreciated by reference to the examples that follow.

EXAMPLE

Cellulose pulp sheets were slurried in NaOH until the NaOH content of the cellulose was between 12.5 and 14.5%. Concurrently, the resulting alkali cellulose (AC) was peroxide aged with $H_2O_2$ (and Mn) until the DP of the alkali cellulose was reduced to between 250 and 400 (Test 3 aging being conducted with 30 minutes of air aging in addition to peroxide aging), xanthated by contact with $CS_2$ and dissolved in dilute aqueous NaOH. The viscose was filtered and, in accordance with the procedure outlined above, the "F" value of the viscose was determined. The operating conditions and results of the process of the subject invention, as well as a comparative example used to help define the parameters of the subject invention, are tabulated below.

| Test # | % NaOH Steeping Solution | Steep Temp (°C.) | Steeping Time (min.) | Pressing Temp. (°C.) | % NaOH In Alkali Cellulose | % $H_2O_2$ Based On Cellulose In Slurry | Mn (ppm) | % $CS_2$ Based Upon Cellulose |
|---|---|---|---|---|---|---|---|---|
| 1 | 13 | 20 | 15 | 50 | 12.05 | 0.61 | 30 | 23.8 |
| 2 | 14.9 | 50 | 15 | 50 | 13.48 | 0.31 | 30 | 23.8 |
| 3 | 14.9 | 50 | 15 | 50 | 13.43 | 0.15 | 30 | 23.8 |
| 4 | 15.9 | 50 | 15 | 50 | 14.24 | 0.28 | 30 | 23.8 |
| Comparative Example | | | | | | | | |
| | 12 | 20 | 15 | 50 | 11.30 | 0.64 | 30 | 23.8 |

| Test # | Xanthating Time (Min) | Xanthating Temp. (°C.) | % NaOH In Viscose Solution | "F" Value |
|---|---|---|---|---|
| 1 | 90 | 30–32 | 4.15 | 543 |
| 2 | 90 | 30–32 | 4.27 | 452 |
| 3 | 90 | 30–32 | 4.20 | 420 |
| 4 | 90 | 30–32 | 4.29 | 375 |
| Comparative Example | | | | |
| | 90 | 30–32 | 4.16 | 143 |

I claim:

1. A process for the production of viscose having an "F" value greater than 250 from cellulose comprising the steps of:
   (i) contacting the cellulose with an aqueous solution containing between 13 and 16 weight percent NaOH for a time and at a temperature sufficient to produce an alkali cellulose with an NaOH content of 12.0 to 15 weight percent and concurrently aging the alkali cellulose by contact with sufficient $H_2O_2$ and 10–40 ppm of a catalyst selected from the group consisting of Fe, Mn and Co compounds to reduce the DP to between 300 and 800;
   (ii) removing excess NaOH from the alkali cellulose;
   (iii) xanthating the alkali cellulose; and
   (iv) dissolving the cellulose xanthate of step (iii) in aqueous NaOH to form a viscose containing at least 4.0% NaOH.

2. The process of claim 1 wherein the contact time of step (i) is at least 5 minutes carried out at a temperature of 10° to 60° C.

3. The process of claim 1 wherein the concentration of $H_2O_2$ is 0.1 to 0.6% by weight of pulp and the catalyst is selected from the group consisting of $KMnO_4$ and $CoCl_3$.

4. The process of claim 1 wherein the step (i) solution concentration of NaOH is 13 to 14 percent and the temperature is about 20° C.

5. The process of claim 1 wherein the DP is reduced to between 250 and 400.

6. The process of claim 1 wherein the peroxide aging is assisted by air aging.

* * * * *